United States Patent [19]

Perchak

[11] Patent Number: 6,081,333
[45] Date of Patent: Jun. 27, 2000

[54] BI-LATERAL SHEARING INTERFEROMETER WITH BEAM CONVERGENCE/DIVERGENCE INDICATION

[75] Inventor: Robert M. Perchak, Dayton, Ohio

[73] Assignee: Mirage Development, Ltd., Dayton, Ohio

[21] Appl. No.: 09/384,884

[22] Filed: Aug. 27, 1999

[51] Int. Cl.[7] .................................................. G01B 9/02
[52] U.S. Cl. .......................... 356/353; 356/399; 356/400
[58] Field of Search .................................... 356/345, 353, 356/354, 399, 400

[56] References Cited

U.S. PATENT DOCUMENTS 4,304,464  12/1981  Hill et al. .................................. 356/353
4,662,750   5/1987  Berger ...................................... 356/353

*Primary Examiner*—Robert H. Kim
*Attorney, Agent, or Firm*—Jos. G. Nauman

[57] ABSTRACT

Opposite wedge plates having identical non-parallel surfaces are joined to provide an optical element which will receive a portion (e.g. one-half) of an input light beam, and project the side-by-side interference patterns directly onto a viewing screen to check for collimation of the beam. The instrument incorporates a rectangular housing having an input window in one side of the housing for admission of the beam being investigated, and a viewing window in another side located at right angles to the input window. A viewing screen is fitted into or supported in the viewing window. The optical element comprises a matched pair of optical wedge plates having the same wedge angle and being supported side-by-side with their wedge directions opposite, and is supported in and across the housing extending at forty-five degrees to the input window, from a corner adjacent the viewing window to an opposite corner. A telescope including a pair of lenses, at least one of which is adjustable with respect to the other, extends from the input window and acts to focus the interference fringe patterns onto the viewing screen. A scale on the telescope indicates the convergence and/or divergence of the beam from its source to the instrument when the patterns are visually equal and in focus.

2 Claims, 4 Drawing Sheets

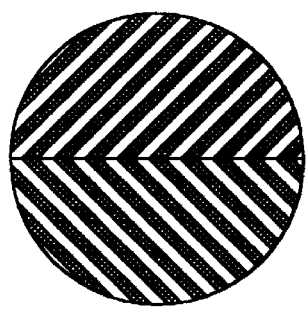 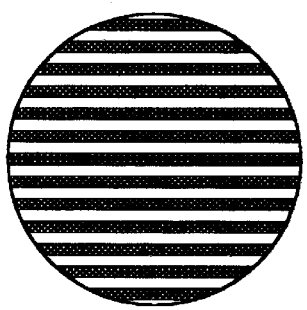 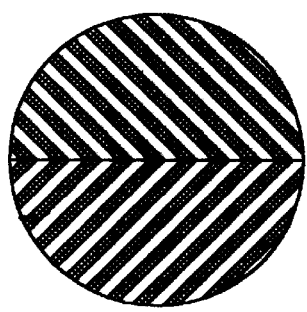
FIG. 3A    FIG. 3B    FIG. 3C
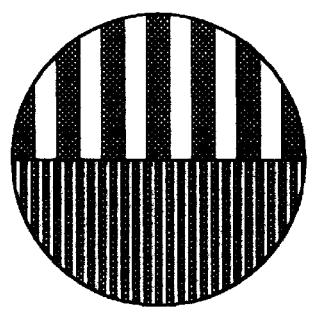 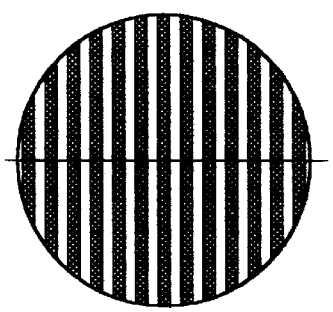 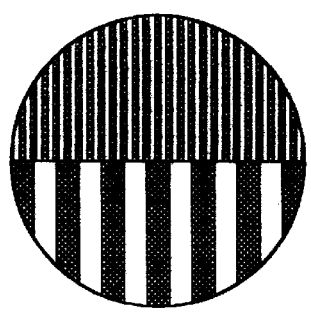
FIG. 4A    FIG. 4B    FIG. 4C
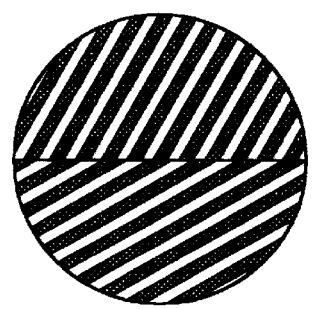 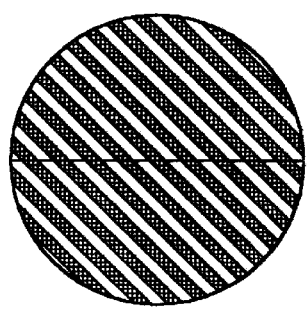 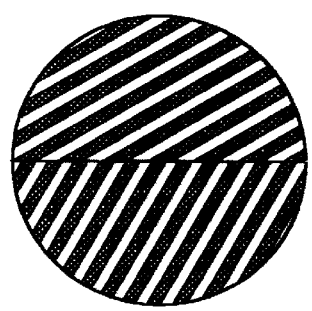
FIG. 5A    FIG. 5B    FIG. 5C

GALLILEAN TELESCOPE

KEPLERIAN TELESCOPE

BI-LATERAL SHEARING INTERFEROMETER WITH BEAM CONVERGENCE/DIVERGENCE INDICATION

FIELD OF THE INVENTION

This invention relates to a modification and improvement in a shearing interferometer, as disclosed and illustrated in U.S. Pat. No. 5,923,426 issued Jul. 13, 1999 for collimation testing, so as also to facilitate measuring convergence and divergence of the beam.

BACKGROUND OF THE INVENTION

The objective of the invention described in said patent is to provide a simple and easy to manufacture shearing interferometer instrument preferably portable, for measuring the degree of collimation of a coherent light source (e.g. a laser) used to establish alignment(s) in construction projects, machinery and other uses where a laser beam is directed over substantial distances. Such uses ordinarily result in some spreading of the beam at long distances (e.g. 40 to 100 meters or more) from the beam source. The present invention utilizes the shearing interferometer for collimation measurement and also improves the sensitivity of At the technique at the least by a factor of two.

In accordance with the patented invention, a simple image shearing (shifting) plate interferometer is comprised of a transparent double-wedge optical element (plate) located at an angle (preferably 45 degrees) from the incoming beam to be measured. The basic principle of operation involves directing a coherent beam of light, to be measured for collimation input, along a determined axis incident at 45 degrees onto the double-wedge element reflecting/refracting sides. Some of the light reflects off a first surface of each of the wedge plates and interferes with light reflected off the second or other surfaces of the wedge plates. This first and second reflected light is directed to a view screen, where there appears resultant side-by-side images of the interference patterns from each wedge plate of the optical element.

The comparative fringe patterns do not rotate with respect to each other, but the number of fringes increases on one side with respect to the other, depending upon whether a diverging or converging beam is directed onto the double-wedge plate element. When the fringe spacing on both sides of the viewing screen appears identical, this indicates a collimated input beam.

In a preferred embodiment of such interferometer the two wedge plates have non-parallel surfaces arranged to receive a portion (e.g. one-half) of the input light beam, and project the side-by-side interference patterns directly onto a viewing screen. The instrument incorporates a rectangular, preferably cube shaped, housing having an input window in one side of the housing for admission of the beam being investigated, and a viewing window in another side located at right angles to the input window. A viewing screen (such as a diffusing plate) is fitted into or ail supported in the viewing window. The optical element is supported in and across the housing extending at forty-five degrees to the input window, from a corner adjacent the viewing window to an opposite corner. This is simple and economical arrangement, retaining a high degree of accuracy and ease of comparison of the two images, and being capable of holding in one hand of the user.

With this shearing interferometer it is simple to determine when a beam of light is collimated. When the sheared wavefronts are made to appear equivalent, then the beam is collimated. Actual measurement of the amount of convergence or divergence of the beam is possible, but is difficult and results in an indirect measurement. One would have to compare the number of fringes over a given distance on one half of the view screen with the number of fringes within the same distance on the other half of the view screen. The number of fringes would then become a variable in an equation which also requires wavelength, wedge angle, etc.

SUMMARY OF THE INVENTION

The present invention is a simple addition to the input of the bi-lateral shearing interferometer instrument which allows the interferometer to continue to act as a comparative device and also provides a direct readout of the value of convergence or divergence. This invention consists of the addition of a simple telescope arrangement (either Keplerian or Gallilean) preferably of 1-× magnification, placed before the input of the interferometer. The telescope uses relatively high quality optics, but it is not necessary to utilize the finest diffraction limited optics because this type of split field interferometer is used for comparison of fringes side-to-side, and not for the inspection of the fringe field to determine aberrations as in other optical shop inspection type devices. The quality of optics used is satisfactory so long as the perturbation of the wave front that is imparted by the telescope optics falls within the symmetry constraints described in said U.S. Pat. No. 5,923,426. For example, using a modified Keplarian telescope of 1-× magnification, i.e. using identical first and second cylindrical lenses, and also assuming that at least one lens is adjustable and can be moved along the optical axis, the "zero" position of the lenses can be set such that a collimated beam entering the telescope also leaves as a collimated beam and then enters the shearing interferometer. By the nature of the interferometer instrument, equivalent fringes will be seen on both halves of the views screen.

When a divergent beam enters the telescope, the beam exiting the telescope will have the same divergence because it is at the zero setting and the magnification is 1-×. Then a pattern consistent with the orientation of the wedges will be displayed on the view screen. Relatively smaller fringes can be seen on one half of the view screen and relatively larger fringes on the other half.

If the lenses are now adjusted in the direction to return the beam exiting the telescope to collimation, then the fringes on each side of the interferometer instrument will become equivalent. If the amount of divergence of the entering beam is known or can be directly calculated, then the amount the input lens had been moved in order to return the fringes to equivalence may then be set to the known divergence. This procedure may be performed for various amounts of divergence and corresponding calibration marks may be assigned to the position of the input lens. Likewise this can be accomplished for a convergent beam.

This invention allows the interferometer instrument to act also as an indicator of collimation, which is what the interferometer instrument is best suited for. The adjustable telescope provided by this invention acts as a means of "nulling" out the input beam. By knowing the amount of adjustment necessary to obtain the null, and calibrating this against known amounts of divergence or convergence, one can produce a device that accurately measures divergence or convergence because of the ease in determining equivalence of fringes on the null indicator, e.g. the interferometer instrument view screen.

It is possible to use small amounts of magnification in the telescope, perhaps in the range 2–4×, which will magnify the input divergence or convergence. However there will be a decrease in the diameter of the output beam of the telescope that is inversely proportionate to the magnification. The maximum magnification used would depend on whether the ultimate spot size on the interferometer instrument were capable of illuminating at least one pair of fringes. At least one pair is necessary for a good determination of equivalence of the fringes on each side of the viewing screen. The amount of magnification would then, of course, be used in the calculation of the actual value of divergence/ convergence.

Thus, the objects and advantages of the invention will be apparent from the following description, the accompanying drawings and the appended claims.

BRIEF DESCRIPTION OF THE DRAWINGS

FIGS. 3A, 3B and 3C show the interference patterns displayed if the wedge directions are normal to the shearing direction and with divergent, collimated, and convergent input beams respectively;

FIGS. 4A, 4B, and 4C show the interference patterns displayed if the wedge directions are parallel to the shearing direction and with divergent, collimated and convergent input beams respectively;

FIGS. 5A, 5B, and 5C show the interference patterns displayed if the wedge directions are not normal to the shearing direction and with divergent, collimated, and convergent input beams, respectively;

DESCRIPTION OF THE PREFERRED EMBODIMENT

Figure 1:
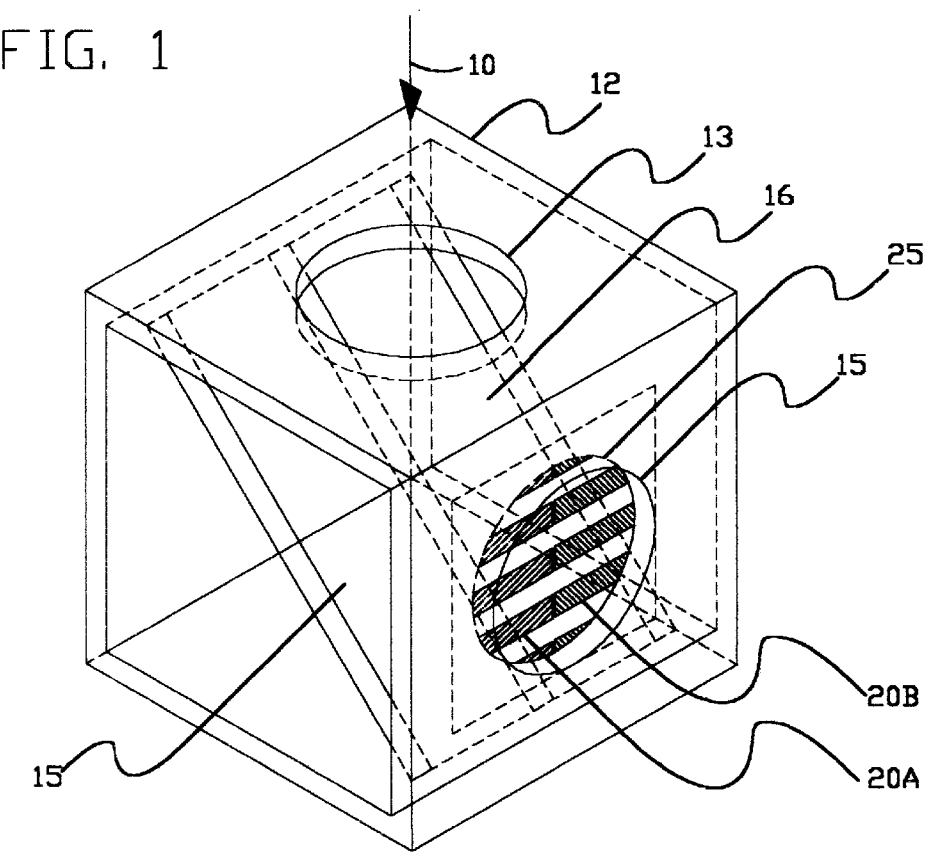
FIG. 1 is a perspective view, with the outer housing in phantom lines, of a dual-wedge plate collimation testing shearing interferometer according to the invention disclosed in U.S. Pat. No. 5,923,426.
Figure 2:
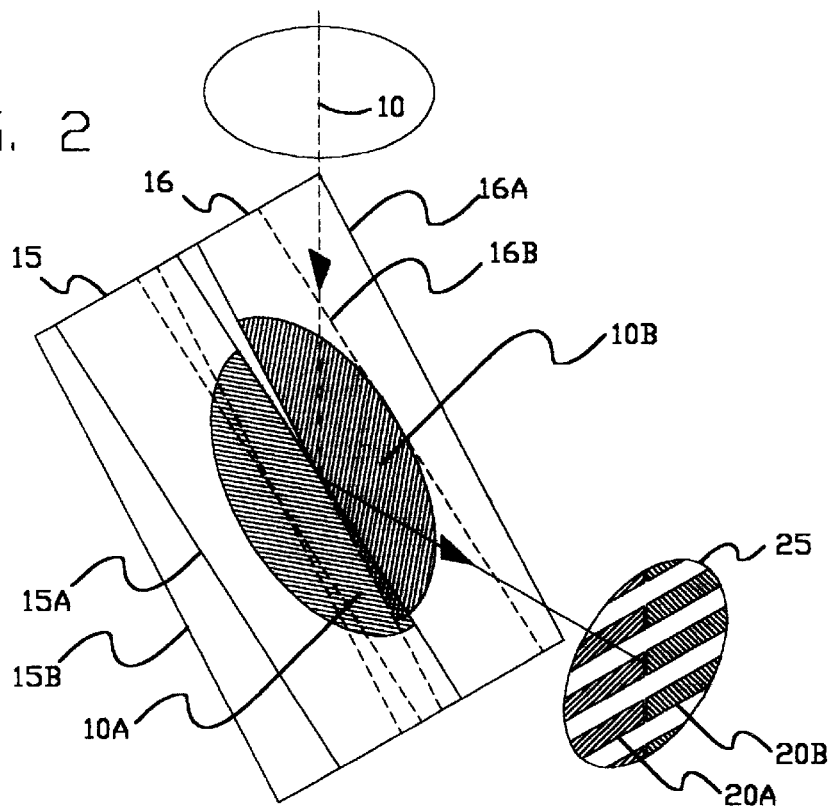
FIG. 2 is a perspective view of the preferred embodiment of that interferometer instrument.

A preferred embodiment of the shearing interferometer is shown in FIGS. 1 and 2. The device has a housing 12 which is shown in phantom as being a generally cubic member, and which is provided with an entrance (input) window or aperture 13 through which the beam 10 under inspection will enter, and a viewing (output) window 15 having a viewing screen 25 on which a pair of images from the beam are directed side by side. The image includes a first portion 20A resulting from the incoming beam 10 as it is incident on a first wedge 15 and the second or remaining portion 20B resulting from the incoming beam 10 as it is incident on a second adjacent wedge 16. It is preferred that the beam portions be equal so as to form the image portions 20A, 204B as complementary parts of a symmetrical image of the shearing interference patterns. The angles of the wedges, i.e. the angularity between their front and rear surfaces 15A, 15B and 16A, 16B are non-parallel, having a selected angle between the planes of those respective surfaces on each wedge. This angularity should be the same for both wedges, and is typically in the order of 20 arc-seconds.

As explained in U.S. Pat. No. 5,923,426, the portion A of input beam 10 will be reflected by the front and rear surfaces 15A and 15B of wedge 15, and generate a first shearing interference pattern (image portion 20A) that may be viewed on screen 25; the other portion 10B of the incoming beam 10 is reflected off the front and rear surfaces 16A and 16B of wedge 16 and generates a second shearing interference pattern, is the image portion 20B, in the opposite direction.

Figure 7A:
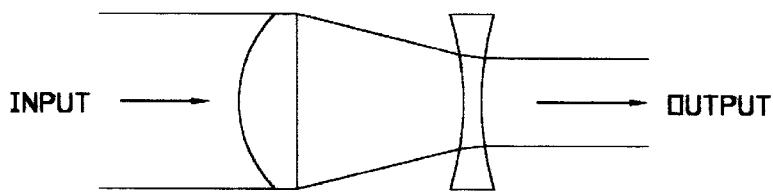
FIGS. 7A, 7B, and 7C are basic diagrams which illustrate different forms of telescopes.
Figure 7B:
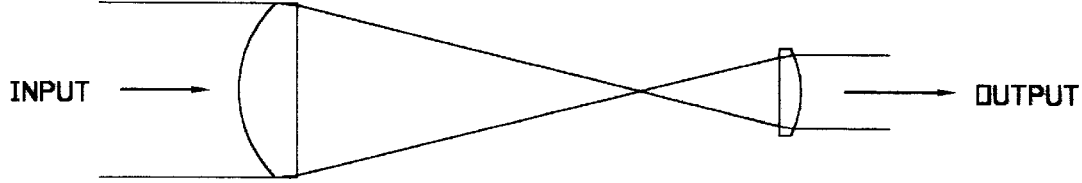
Figure 7C:
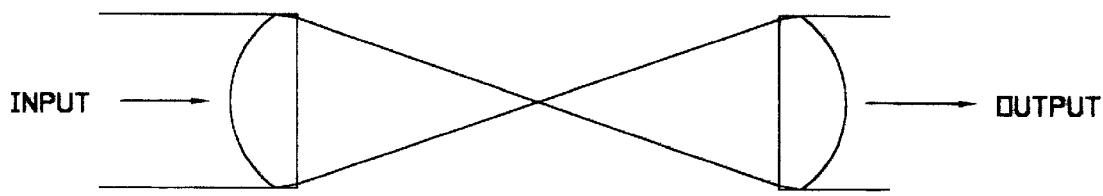

Referring to FIGS. 3, 4, & 5, FIGS. 4A & 4B display the preferred fringe pattern, which exhibits generally straight and evenly spaced line patterns, as in FIG. 4A. FIGS. 5A, 6A, & 7A show typical patterns obtained on glass samples. The method of preparing the double wedge plate, as described in said patent, uses the symmetry of fringes to choose an appropriate single piece of optical material and enables the cutting and separating of a single glass sample or source plate into two wedges that produce equivalent fringes in each wedge along the line of separation.

As explained in said patent the embodiment shown in FIG. 1 and FIG. 2 displays interference fringes on the viewing screens 25, as shown in FIGS. 3A–C, 4A–C and 5A–C. FIGS. 3A, 3B and 3C show the interference patterns if the wedge directions are normal to the shearing direction and with divergent (FIG. 3A), collimated (FIG. 3B), and convergent (FIG. 3C) input beams, respectively. FIGS. 4A, 4B, and 4C show the interference patterns if the wedge directions are parallel to the shearing direction and with divergent (FIG. 4A), collimated (FIG. 4B), and convergent (FIG. 4C) input beams respectively. FIGS. 5A, 5B and 5C show the interference patterns if the wedge directions are not normal to the shearing direction and with divergent (FIG. 5A), collimated (FIG. 5B), and convergent (FIG. 5C) input beams respectively.

FIGS. 11A, 11B & 11C show the basic arrangements for three different types of telescope. FIG. 11A shows a Gallilean telescope using a positive power lens and a negative power lens, in which the image is not inverted. FIG. 11B shows a Keplerian telescope using two positive power lenses of different power, in which there is inversion of the image. FIG. 11C shows a special case of a Keplarian telescope wherein the two positive lenses have the same power, and this is the preferred arrangement for the addition to the shearing interferometer according to the present invention from the standpoint of simplicity and adequacy.

Figure 6:
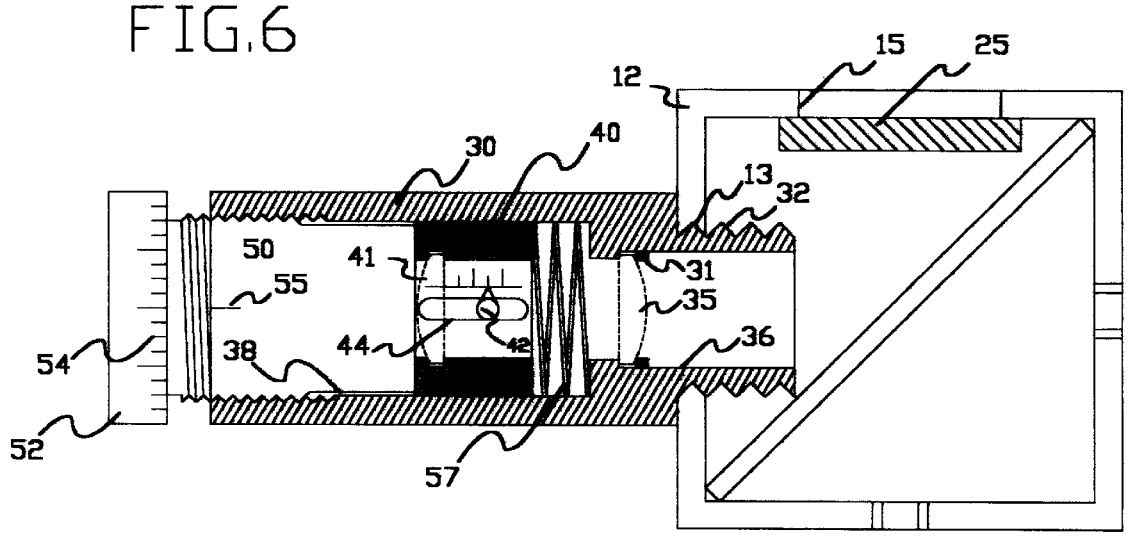
FIG. 6 is a side view, partly in cross-section and partly in elevation, illustrating the attachment per se, which permits the user to measure convergence and divergence of the beam.
Figure 8:
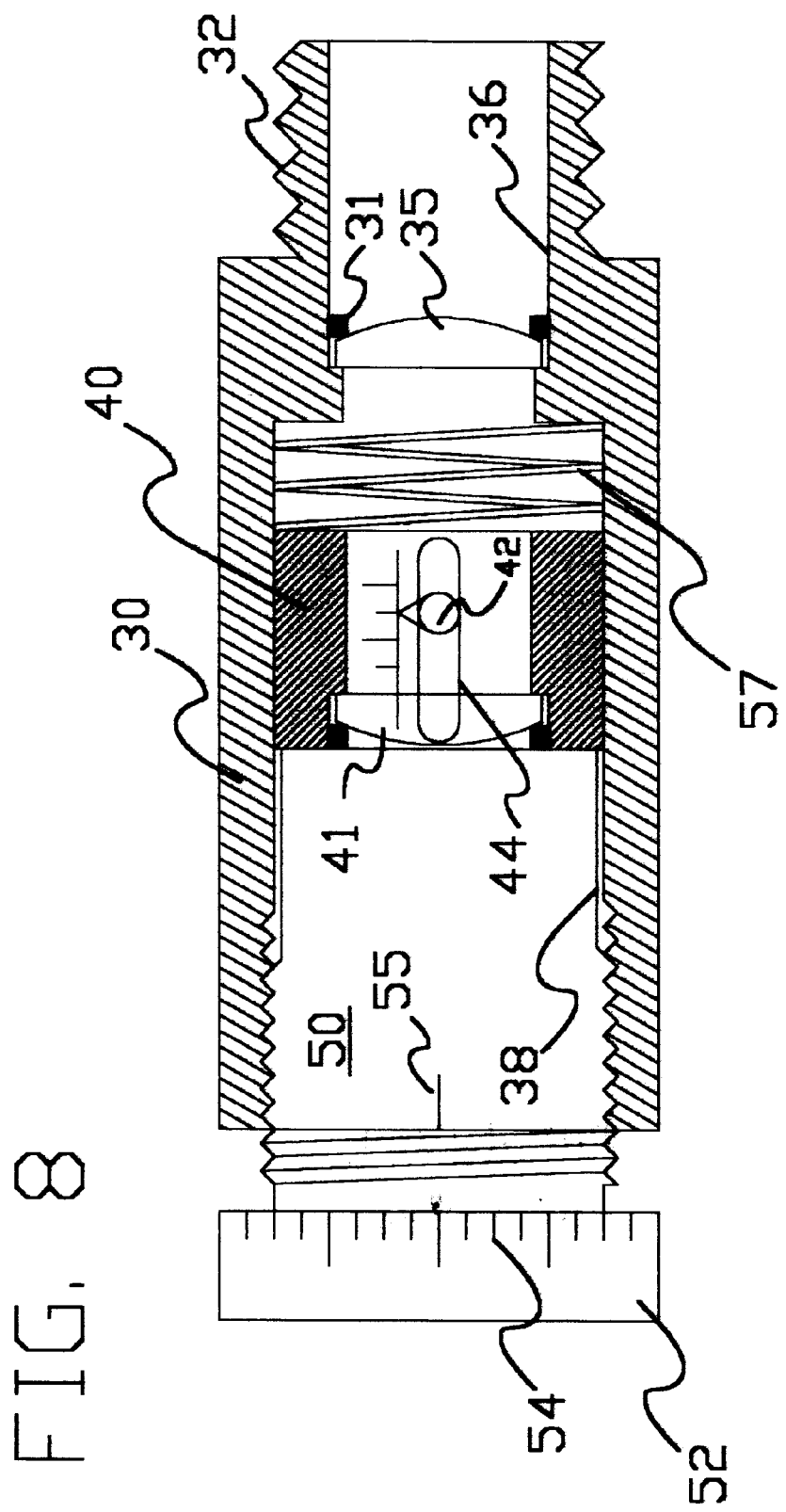
FIG. 8 is an enlarged side view, with parts broken away and shown in cross-section, showing details of the attachment provided by the present invention.

FIGS. 6 and 8 illustrate an adjustable telescope attachment or accessory comprising a tubular outer body 30 having a threaded end 32 for mounting to the housing 12, aligned with the entrance aperture 13. The output lens 35 of the telescope is mounted within a counter bore 36 in body 30, inside threaded end 32. Lens 35 is held in the counterbore by a retainer ring 31. Inside a larger counterbore 38, at the forward end of the attachment, there is a cylindrical holder which functions as a movable carrier 40 for the input lens 41.

Carrier 40 is slidable within body 30, and carries a radially extending indicator arm 42 which projects through a slot 44 in the wall of body 30, the slot extending part way along body 30. At the input end of the telescope (left side of FIGS. 6 and 8) an adjustment body (or plug) 50 is threaded into the larger counterbore 38 in body 30. Body 50 has an exterior control ring 52 marked with a fine indicator scale 54 which cooperates with an index mark 55 on body 30. A spring 57 urges carrier 40 into contact with body 50, such that rotation of ring 52 causes appropriate inward/outward adjustment of carrier 40 and its input lens 41.

While the methods herein described, and the forms of apparatus described constitutes a preferred embodiment of this invention, it is to be understood that the invention is not limited to this precise form of apparatus, and that changes may be made without departing from the scope of the invention, which is defined in the appended claims.

What is claimed is:

1. A portable instrument for testing collimation of a beam, and measuring divergence and convergence of the beam from the instrument to a source of such beam, comprising a housing having an input window for receiving the beam to be investigated and a viewing window at which adjacent images are displayed according to the collimation of the beam as it enters said input window, an optical element within said housing, said optical element including a matched pair of optical wedge plates having the same wedge angle and being supported side-by-side with their wedge directions opposite, said wedge plates extending at a predetermined angle to the axis of the input window, a viewing screen supported in said viewing window and providing a viewing screen for images, said wedge plate also extending at a second angle complementary to said to said viewing screen, whereby the adjacent fringe line images are back projected onto said viewing screen for viewing from the exterior of said viewing window; the improvement comprising a telescope attached to said housing extending from said input window, said telescope comprising a pair of lenses supported for relative movement to each other, said lenses being adapted to receive a beam and to transmit such beam through said input window, and means for indicating the displacement of said lenses to display the distance from the source of the beam to the instrument when the fringe line images are visually equal.

2. A portable optical instrument for testing collimation of a beam and determining convergence and divergence of the beam between the instrument and the beam source, comprising a housing having an input window for receiving the beam to be investigated and a viewing window at which adjacent images are displayed according to the collimation of the beam as it enters said input window, an optical element within said housing, said optical element including a matched pair of optical wedge plates having the same wedge angle and being supported side-by-side with their wedge directions opposite, said wedge plates extending at a predetermined angle to the axis of the input window, a diffuser plate supported in said viewing window and providing a viewing screen for the images, said diffuser plate extending at a second angle complementary to said predetermined angle of said wedge plates, whereby the adjacent fringe line images are back projected onto said diffuser plate for viewing from the exterior of said viewing window, a telescope attached to said housing extending from said input window, said telescope comprising a pair of lenses supported for relative movement with respect to each other, said lenses being adapted to receive a collimated beam and to transmit such beam through said input window, and means for indicating the displacement of said lenses to display an indication of divergence and convergence of the beam.

* * * * *